United States Patent [19]
Roberts et al.

[11] 3,728,446
[45] Apr. 17, 1973

[54] SPECKLED DENTIFRICE GEL

[75] Inventors: Francis D. Roberts, West Millington; James Norfleet, Plainfield, both of N.J.

[73] Assignee: Colgate-Palmolive Company, New York, N.Y.

[22] Filed: Jan. 11, 1971

[21] Appl. No.: 105,652

Related U.S. Application Data

[63] Continuation-in-part of Ser. No. 54,635, July 13, 1970, abandoned.

[52] U.S. Cl. ..................424/49, 424/52, 424/54, 424/56, 424/57
[51] Int. Cl. .............................A61k 7/16
[58] Field of Search .................424/49–58

[56] References Cited

UNITED STATES PATENTS 3,538,230   11/1970   Pader et al. ...........................424/50

OTHER PUBLICATIONS

Kaneniwa et al., "Yakuzaigaku," Vol. 27, No. 3, pages 56–60, 1967.

*Primary Examiner*—Richard L. Huff
*Attorney*—Herbert S. Sylvester, Murray M. Grill, Norman Blumenkopf, Ronald S. Cornell, Thomas J. Corum, Richard N. Miller and Robert L. Stone

[57] ABSTRACT

Oral composition containing aqueous liquid and alkali metal carboxymethyl cellulose gelling agent and including non-toxic impalpable colored particles of insoluble salt of the gelling agent. The composition is formed by coloring a soluble polyvalent metal salt, such as aluminum sulfate, or soluble polyvalent metal hydroxide such as calcium hydroxide which forms a water-insoluble salt with the gelling agent, such as aluminum or calcium carboxymethyl cellulose. The dyed salt or hydroxide is then incorporated into the oral composition thereby forming non-toxic impalpable particles of the insoluble salt of the metal with the gelling agent. The speckled dentifrice may also be formed by first incorporating the metal salt or hydroxide into a dyed dentifrice gel thus permitting dye from the gel to become adsorbed into the thereby formed particles, or by incorporating the metal salt or hydroxide into an uncolored gel thereby forming particles which are themselves colored or are then dyed.

11 Claims, No Drawings

SPECKLED DENTIFRICE GEL

This application is a continuation-in-part of Ser. No. 54,635, filed July 13, 1970, now abandoned.

This invention relates to a speckled oral composition; more particularly it relates to a dentifrice gel which includes esthetically pleasingly colored particles.

In the past, dentifrices have been colored in whole or in part to produce various esthetic effects. It has been particularly desired to produce a dentifrice containing visible or attractively colored particles. Such particles have often imparted characteristics to the dentifrice which may not be wholly desirable. Thus, flavor or abrasiveness may be too greatly concentrated in these particles and not sufficiently distributed throughout the dentifrice. Furthermore, such particles may be palpable and impart a degree of grittiness to the dentifrice which some people may find annoying.

It is an advantage of the invention that speckled or colored particles are provided in a dentifrice, which particles are esthetically pleasing but are without disadvantages which have been present in speckled dentifrices of the prior art. Additional advantages of this invention will be apparent from consideration of the following specification.

In accordance with certain of its aspects, this invention relates to a dentifrice gel composition comprising a gel vehicle comprising an aqueous liquid and alkali metal carboxymethyl cellulose gelling agent and having incorporated therein impalpable non-toxic colored particles of the water insoluble salt of carboxymethyl cellulose and a polyvalent metal.

The polyvalent metals employed are in the form of their water-soluble salts or water-soluble hydroxides (the solubility being sufficient to enter into reaction with alkali metal carboxymethyl cellulose). They should also be substantially non-toxic upon placement in the oral cavity, even though the amount of soluble polyvalent metal ion remaining after reaction as alkali metal carboxymethyl cellulose is minimal. The following polyvalent metals may be used:

| METAL | PERIODIC GROUP | ATOMIC NO. |
|---|---|---|
| Magnesium | II A | 12 |
| Calcium | II A | 20 |
| Strontium | II A | 38 |
| Barium | II A | 56 |
| Aluminum | III A | 13 |
| Gallium | III A | 31 |
| Germanium | IV A | 32 |
| Tin | IV A | 50 |
| Lead | IV A | 82 |
| Iron | VIII | 26 |
| Nickel | VIII | 28 |
| Zinc | II B | 30 |
| Cadmium | II B | 48 |

Each of these polyvalent metals is characterized as being selected from the group consisting of a member of periodic Group II A having an atomic weight of 12–56, Group VIII having an atomic number of 26 and 28, Group II B having an atomic number of 30 and 48, Group III A having an atomic number of 13 and 31 and Group IV A having an atomic number of 32–82.

Metals set forth above which are capable of forming water-soluble salts or hydroxides in two polyvalent valences, such as iron and tin may be employed in both valence forms.

The prepared salts and hydroxides used in forming insoluble salt of carboxymethyl cellulose are aluminum, calcium, iron, cadmium and tin, particularly aluminum and calcium.

Dentifrices such as toothpastes which may be translucent, transparent, as well as opaque, contain a dental vehicle which forms a gel or creamy mass of a consistency which can be desirably extruded from a collapsible tube such as an aluminum tube, or a lead tube.

The vehicle, often referred to as a gelled vehicle, contains liquids and solids. In general, the liquid comprises water and/or a humectant such as glycerine, sorbitol, propylene glycol or polyethylene glycol 400 including suitable mixtures thereof. It is usually advantageous to use a mixture of both water and one or two humectants. The total liquid content is generally about 20–29 percent by weight of the vehicle. In transparent and translucent vehicles the liquid content of the toothpaste may be about 20–90 percent by weight, while in opaque vehicles the total liquid content is usually about 20–50 percent by weight. The preferred humectants are glycerine and sorbitol. Typically clear, that is transparent or translucent, vehicle contains 0–80 percent by weight of glycerine, about 20–80 percent by weight of sorbitol and about 20–80 percent by weight of water. Opaque vehicles typically contain about 15–35 percent by weight of glycerine and about 10–30 percent by weight of water.

The solid portion of the vehicle is a gelling agent. In the instant invention the gelling agent includes alkali metal carboxymethyl cellulose in amount of at least about 0.25 percent by weight of the vehicle. Additional gelling agents may also be present. Gelling agents which may be additionally present include viscarin, gelatin, starch, glucose, sucrose, polyvinyl pyrollidone, polyvinyl alcohol, gum tragacanth, gum karaya, hydroxy propyl cellulose, methyl cellulose, carboxyethyl cellulose, sodium alginate, Laponite CP or SP, which are each synthetic inorganic complex silicate clays sold under trademwrk by Laporte Industries, LTD., and magnesium aluminum silicate gel. The solid portion or gelling agent of the vehicle is typically present in amount of about 0.25–10 percent by weight of the toothpaste and preferably about 0.35–5 percent by weight. Alkali metal carboxymethyl cellulose includes the lithium, sodium and potassium salts.

In accordance with this invention, particles are formed in the oral preparation which are already colored at thier time of formation or are suitable for being colored by incorporating a water-soluble polyvalent metal salt of hydroxide, such as aluminum sulfate, calcium hydroxide, stannous fluoride, ferric sulfate, cadmium slufate and the like, in a gelled dentifrice vehicle thereby forming particles which are the reaction product of the metal of the salt or the hydroxide with alkali metal carboxymethyl cellulose. (When stannous fluoride is employed to form the particles, fluoride can also be provided to the finished dentifrice.) The salt or hydroxide is added to the gel with agitation to form the water-insoluble particles. The particles may be long, irregular, circular, oval or other various shapes depending on the polyvalent metal employed. When aluminum sulfate is employed, oval shaped water-insoluble particles of aluminum carboxymethyl cellulose are formed. The metal salt or hydroxide is incorporated in the gelled vehicle in this and other techniques of the invention in amount sufficient to react wtih at least about 5 percent by weight of the gelling agent, typically about 5–30 percent when alkali metal carboxymethyl cellulose is the sole gelling agent, and in greater amounts if additional gelling agents are present, thereby forming the impalpable non-toxic, insoluble particles of the invention.

The quantity of Salt or hydroxide added must not be sufficient to destroy the gel character of the oral composition.

If the water-soluble polyvalent metal salt or hydroxide is not dyed at the time it is incorporated into the gelled dentifrice to form impalpable water-insoluble particles such as particles of aluminum carboxymethyl cellulose, then a gelled vehicle which has been previously dyed can be employed. The dye in the gelled vehicle is absorbed on the substrate of water-insoluble particles thereby creating a speckled effect. The color of the particles dyed in this manner is a deeper color than that of the surrounding gel and thus desirable visual constrast is obtained. Moreover, since the absorbed dye on the particles is substantive, the gelled vehicle can be again dyed to modify its color and increase contrast with the particles which are not themselves further dyed.

Preferably, the water-soluble polyvalent metal salt or hydroxide is dyed before it is blended with the dentifrice. The gelled vehicle may be clear, translucent or opaque. In this technique the metal compound such as aluminum sulfate is dyed by dry blending as with a mortar and pestle or more preferably by adding a solution of the dye in alcohol such as ethanol, or other volatile solvent for the dye which has little solvent action on the metal compound, such as acetone. After the metal compound is thus treated the solvent is evaporated leaving an evenly colored compound. The colored compound is then slowly incorporated into the dentifrice gel while agitating thereby forming dyed particles of the carboxymethyl cellulose of the metal of the compound, such as aluminum carboxymethyl cellulose.

If desired, the salts or hydroxides which are to be contacted with the gelled vehicles may be colored various colors and the dentifrice gel vehicle may also be dyed, thus permitting formation of a toothpaste which has multi-contrasting colors with an irridescent beaded effect.

Alternatively a particularly desirable esthetic dentifrice is formed by dyeing the particles with a red dye and leaving the gelled vehicle white.

Moreover yellow to rust colored particles are formed when the carboxymethyl cellulose is reacted with materials such as ferrous and ferric compounds. Such particles need not be dyed.

If desired the gelled vehicle may also be milled with dentifrice polishing agents, flavor and additional components of a dentifrice prior to incorporating therein the colored metal salt or hydroxide, which could then be mixed with the dentifrice, typically with a Hobart mixer.

The substrate of dyed particles in the gelled dentifrice vehicle are impalpable and are easily cleared from the oral cavity following toothbrushing. When the particles are aluminum carboxymethyl cellulose, they are typically about 0.1–1.5mm in size and are generally oval in shape. When they are formed in the gelled vehicle in which polishing agent, flavor and other components have been previously incorporated, they are generally about 0.3–1.5mm in size. When they are formed in the gelled vehicle prior to addition of further components to the vehicle they are generally reduced in size during milling with the remaining components and may then be about 0.1–1mm in size.

Generally the colored particles have a Munsell chroma sufficient to impart desirable contrast between the substrate particles and the less colored, white or clear gel. Of the one or more colors used for dyeing purposes, at least one comparatively bright one should be employed to secure attractive contrast. Upon adsorption of the dye on the metal carboxymethyl cellulose a mordant-type dye is formed.

Individuals differ in thier response to various color stimuli but as a rule bright colors will be of a Munsell value within the range of 3–8, as determined by ordinary visual examination of standard Munsell color charts. Not all colors with Munsell characteristics in this range will always be useful in making distinctively speckled products. Those yellows of lower Munsell value within the range given which also have lower chroma within the range are drab, while those near values 7 and 8 are bright, even vivid. On the other hand, darker hues such as blue, purple-blue and purple are pastels at Munsell value 8, even at some chroma above 4, but are attractive bright colors at Munsell value 3 if of sufficiently high chroma. For most colors, if the Munsell value is between 4 and 7 and the chorma above 4, sufficient brightness will be obtained to allow the production of an attractively contrasting speckled dentifrice gel.

As a few examples of the most advantageous colors are given the following appearing in the Munsell Book of Color, Standard Edition, Munsell Color Company, Inc., Baltimore, MD. (1929); 5 Red 4/14; 10 Red Purple 3/10; 10 Purple 4/10; 5 Yellow Red 6/12; 10 Green 5/6; 2.5 Yellow 8/12; 7.5 Yellow 7/10; 5 Yellow 8/12; 10 Yellow 7/8; 5 Green Yellow 5/8; 5 Green 5/8; 5 Blue Green 4/6; 5 Blue 4/8; 5 Purple Blue 3/12; 5 Purple Blue 4/10; 5 Purple 4/12; 5 Purple 3/10; 5 Red Purple 4/12.

The numeral before the hue word denotes thw specific hue. Thus 5Y denotes a pure yellow, exactly midway between Yellow Red and Green Yellow, while 2.5Y is a hue halfway between Yellow and Yellow Red-Yellow. The fractional numeric designators are for value (numerator) and chroma (denominator).

The above listing of respresentative suitable colors indicates, as is generally the case, that the preferred colors are thos of higher chroma. The preferred value level is dependent to an extent upon the hue selected. Since the publication of the Munsell Book of Color, which is still one of the most useful references for color identification, the development of fluoroescent dye materials such as D & C Red 19 and other newer dyestuffs has made it possible to obtain colors of much greater brightness to the eye than those shown by Munsell. These colors may be considered to have higher chroma, as a consequence of which they are even more useful for dyeing particles to give them a strong contrast against a background. A method of identifying and coding such fluorescent dye and pigment products has not been universally accepted but one practical way of describing materials colored by them is by assigning higher chorma in the Munsell system. Red particles of attractive color and birthgness completely colored with the fluorescent dye, D & C Red 19 contrast strongly with a white or colorless dentifrice vehicle. It is highly desirable to use fluoroescent dyes of strong color which yield particles of Munsell chroma greater than 10. Alternatively fluoroescent dyes may be added to ordinary dyes to give such a bright color.

The hue or color may have any chromatic character. Yellow, red, green, blue and purple are all satisfactory, as are the multitudinous intermediates. White and black are less desirable, the former because it does not contrast with the usual light colored vehicle and the latter because it is inapprporiate in a product designed for cleansing teeth. Nevertheless, pure white and black are definitely useful in tinting or shading the chromatic hues to numerous intermediate colors.

Of the colors avaialbe it is preferred to use th reds, blues and purple-blues, rather than the yellows and browns. Even the coloring agents resulting in a "metallic" appearance, e.g., silver, gold, may be employed.

Methods for identifying color other than the Munsell system may also be employed. The trichromatic coefficients of the International Commission of Illumination, obtainable by measuring reflectance using Standard Illuminant C and prescribed filters, enable one to determine the dominant wave length and degree of saturation of a particular color and the reflectance (Y) indicates the brightness of the color. These indicia correspond to the hue, chroma and value of the Munsell system. The I. C. I. method takes account of the psychophysical factor by integration of the responses of a "normal observer" by use of special filters.

Munsell standard colors have been analyzed by the I.C.I. methods and in the literature there have been published conversion charts from Munsell to I. C. I. These charts may also be used reversibly. Prime sources of such tabluations and charts are found in the Journal of the Optical Society of America, Vol. 30, pages 609-616 (DEc. 1940) and J.O.S.A., Vol. 33, pages 385-418 (1943).

Although both the Munsell and I. C. I. Systems are capable of defining colors accurately and conversions can be made from one system to the other, it is not always possilbe to easily and simply define a broad class of clors in one system from a description of that class in the other. In the present case the class of bright colors usually lies within the range of 0.12 to 0.43 in luninous reflectance (Y) but, as with Munsell values, this may be enlarged to about 0.07 to 0.60 if the right hue is employed. A few bright colors, especially the yellows and greens, which have reflectances a little above 0.60, are useufl even though outside the range of reflectances given above. Similarly, some blues and purples are also useful which have excitation purities below 20 percent.

Still another method of describing color is that commonly known as the Ostwald Color Triangle System. The Ostwald system, like these of the Munsell and I. C. I., analyzes color into hue (chormatic), achromatic and hue strength. The Ostwald notation is also convertible to Munsell and I. C. I. figures.

No matter which of the above or other systems for identifying color is employed the results will depend on the particular illuminant lighting the colored surface and also to some extent upon the character of the surface itself and the viewing angles. Most of the determinations described in this application were made by the standard method of directing illuminating light at an angle of 45° to the flat color surface although the equivalent reverse method is also staisfactory. Usually daylight viewing of color is the ultimate test, but, because daylight varies in wave lengths a standard light source which simulates daylight, such as illuminant C, is preferably employed in all determinations. Occassionally, diffuse lighting may be found most practicable.

The particular color of the brightly colored particles is most important in securing a distinctive speckled effect to the dentifrice composition. Of course, the color of the "background" gelled vehicle is also of some influence.

The background gelled vehicle will generally be of a light color, clear or colorless. In most cases this will be a white, near white, light clear, colorless, although pastels also have been found to give a satisfactory contrasting product, It is preferred that the background material be of a shade which usually will have a Munsell value above 7 and a Munsell chroma in the range 0 to 4. The background color may also be a white or near white or great brightness of chroma.

In the science of color measurement it is known that complementary colors usually harmonize. Colors, which strictly speaking, are not truly complementary, also often are found to be perfectly harmonious when used in the proper amounts and proportions. But as far as color contrast is concerned, there is no fixed rule or simple scientific method for predicting or describing it. The layman knows that color combinations such as blue and white, purple and yellow, red and blue, brown and yellow, green and white and many others may contrast sharply. Contrasts can also be made using hues of different values and chroma. Thus, scarlet constrasts with pink and royal blue stands out well against a pastel blue background. Similarly strong bright colors contrast with pastels of other hues.

The proportions of contrasting colored materials may be varied widely, but to secure an effect considered pleasing by the average consumer the brightly colored particles should be in the minority to provide sufficient particles to be significantly discernible over at least about 0.5 percent of the surface area of the vehicle. To secure still better contrast it is preferred that the dyed particles be discernible over between about 2 and 30 percent of the surface area of the vehicle.

Any suitable substantially water-insoluble polishing agent may be added to the gel vehicle. There is a relatively large number of such materials known in the art. Representative materials include, for example, dicalcium phosphate, tricalcium phosphate, insoluble sodium metaphosphate, aluminum hydroxide, magnesium carbonate, calcium carbonate, calcium pyrophosphate, calcium sulfate, bentonite, etc., including suitable mixtures thereof. It is preferred to use the water-insoluble phosphate sodium metaphosphate and/or a calcium phosphate, such as dicalcium phosphate dihydrate. In general, these polishing agents will comprise a major proportion by weight of the solid ingredients. The polishing agent content is variable, but will generally be up to about 75 percent by weight of the total composition, generally about 20–75 percent; although, as indicated below, even lower amounts of polishing agent can be employed.

In accordance with preferred aspects of the invention the polishing agent which may be added to the gel vehicle is amorphous silicic anhydride or dehydrated silica gel polishing agent which, when employed, most preferably has an average particle size of about 2–55 microns and a surface area of about 200–450m²/g. Typical examples of such materials are Syloid 72 and Syloid 74 which are described in "The Davison Family of Syloid Silicas" published by their manufacturer, Grace, Davison Chemical Company, and Santucel 100, manufactured by Monsanto Company. Dehydrated silica gels having greater surface areas, such as more than about 600m²/g, such as Syloid 63, also manufactured by Grace, Davison Chemical Company, may also be employed. However, such materials are poorer in polishing ability and are more abrasive to dental enamel than the agents having less surface area.

An additional highly desirable polishing agent which may be added to the gel vehicle is a complex sodium aluminosilicate which has a refractive index of about 1.44–1.47, up to about 20 percent by weight of moisture and up to about 10 percent by weight of sodium oxide. Typically, this material has a particle size of up to about 35 microns, preferably about 1–20 microns. The preferred moisture content is about 10–20 percent by weight, measured by loss at 105° C. and the typical content of sodium oxide is about 5–10 percent by weight. Generally, the agent has a loose bulk density of up to about 0.2g/cc, preferably about 0.07–0.12gcc.

The amorphous silicic anhydride or dehydrated silica gel and complex sodium aluminosilicate polishing agents when present are employed in amounts of about 5–50 percent of the dentifrices, preferably about 10–30 percent by weight.

Other polishing agents such as dicalcium phosphate and others mentioned above may be used in transparent or translucent dentifrices in addition to amorphous silicic anhydrides in amounts up to about 10 percent of the dentifrice. Greater amounts would tend to substantially diminish the clarity of the product.

Any suitable surface active or detersive material may be incorporated in the gel vehicle. Such compatible materials are desirable to provide additional detersive, foaming and anti-bacterial properties depending upon the specific type of surface active material and are selected similarly. These detergents are water-soluble organic compounds usually, and may be anionic, nonionic, or cationic in structure. It is preferred to use the water-soluble non-soap or synthetic organic detergents, usually. Suitable detersive materials are known and include, for example, the water-soluble salts of higher fatty acid monoglyceride monosuflate detergent (e.g., sodium coconut fatty acid monoglyceride monosulfate), higher alkyl sulfate (e.g., sodium lauryl sulfate), alkyl aryl sulfonate (e.g., sodium dodecyl benzene sulfonate), higher fatty acid esters of 1,2-dihydroxy propane sulfonate), and the like.

The various surface active materials may be used in any suitable amount generally from about 0.05 to about 10 percent by weight, and preferably from about 0.5 to 5 percent by weight of the dentifrice composition.

It is a further embodiment of the present invention to use the substantially saturated higher aliphatic acyl amides of lower aliphatic amino carboxylic acid compounds, such as those having 12 to 16 carbons in the acyl radical, and as more particularly described in U.S. Pat. No. 2,689,170, issued Sept. 14, 1954. The amino acid portion is derived generally from the lower aliphatic saturated monoamino carboxylic acids having about 2 to 6 carbons, usually the monocarboxylic acid compounds. Suitable compounds are the fatty acid amides of glycine, sarcesine, alanine, 3-aminopropanoic acid and valine having about 12 to 16 carbons in the acyl group. It is preferred to use the N-lauroyl myristoyl and palmitoyl sarcoside compounds, however for optimum effects.

The amide compounds may be employed in the form of the free acid or preferably as the water-soluble salts thereof, such as the alkali metal, ammonium, amine and alkylolamine salts. Specific examples thereof are sodium and potassium N-lauroyl, myristoyl and palmitoyl sarcosides, ammonium and ethanolamine N-lauroyl sarcoside, N-lauroyl sarcosine, and sodium N-lauroyl glycine and alanine. For convenience herein, reference to "amino carboxylic acid compound," "sarcoside," and the like refers to such compounds having a free carboxylic group or the water-soluble carboxylate salts.

Such materials are utilized in pure or substantially pure form. They should be as free as practicable from soap or similar higher fatty acid material which tends to reduce the activity of these compounds. In usual practice, the amount of such higher fatty acid material is less than 15 percent by weight of the amide and insufficient to substantially adversely affect it, and preferably less than about 10 percent of said amide material.

Various other materials may be incorporated in the vehicles of this invention. Examples thereof are preservatives, silicones, chlorophyll compounds, ammoniated materials such as urea, diammonium phosphate and mixtures thereof, materials which can increase contrast with the particles, such as zinc oxide or titanium dioxide and other constituents. These adjuvants are incorporated in the instant compositions in amounts which do not substantially adversely affect the properties and characteristics suitably selected and used in proper amount depending upon the particular type of preparation involved.

Antibacterial agents may also be employed in the gelled vehicles of the instant invention. Typical antibacterial agents include $N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-N-p-chlorobenzylbiguanide;
1,6-di-p-chlorophenylbiguanide hexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis(2-ethylhexyl)-3-methylhexahydro pyrimidine;

and their non-toxic acid addition salts.

The antibacterial agent, when present, is employed in amounts of about 0.1–5 percent by weight, preferably about 0.05–5 percent.

Any suitable flavoring or sweetening materials may be employed in formulating a flavor for the compositions of the present invention. Examples of suitable flavoring constituents include the flavoring oils, etc., oils of spearmint, peppermint, wintergreen, sassafras, clove, sage, eucalyptus, marjoram, cinnamon, lemon and orange, as well as sodium methylsalicylate. Suitable sweetening agents include sucrose, lactose, maltose, sorbitol, sodium cyclamate and saccharine. Suitably, flavor and sweetening agent may together comprise from about 0.01 to 5 percent or more of the compositions of the instant invention.

A fluorine-containing compound having a beneficial effect on the care and hygiene of the oral cavity, e.g., diminution of enamel solubility in acid and protection of the teeth against decay may also be incorporated in the gelled vehicle. Examples thereof include sodium fluoride, stannous fluoride, potassium fluoride, potassium stannous fluoride ($SnF_2.KF$), sodium hexafluorostannate, stannous chlorofluoride, sodium fluorozirconate, and sodium monofluorophosphate. These materials, which disassociate or release fluorine-containing ions in water, suitably may be present in an effective but non-toxic amount, usually within the range of about 0.01 to 1 percent by weight of the water soluble fluorine content thereof.

The composition should have a pH practicable for use. A neutral to basic pH is particularly desirable. The initial pH range of about 4 to 10 preferably 6–8 is considered the most practicable for use. The reference to pH herein is intended to refer to the pH determined on the dentifrice directly. If necessary, basic materials or acidic materials may be added to adjust the pH as desired.

The particular pH can also affect the formation of insoluble particles of carboxymethyl cellulose with polyvalent metal salt or hydroxide. Thus, the particles may form more readily with some metals, such as zinc at the higher range of pH values. Aluminum can be used to readily form the salt with carboxymethyl cellulose over a wide range of pH values.

Synthetic finely divided silicas such as those sold under the trademarks Cab-O-Sil M5, Syloid 244, Syloid 266, and Aerosil D200 may also be employed particularly in clear dentifrices in amounts of about 0.5–20 percent by weight to promote thickening and to improve clarity.

The following specific examples are further illustrative of the nature of the present invention that it is to be understood that the invention is not limited thereto. All amounts in proportions are by weight unless otherwise indicated.

EXAMPLE 1

Aluminum sulfate is added to a sodium carboxymethyl cellulose gel which has been previously dyed with a 0.1 percent aqueous solution of D & C Red No.19 dye. The gel also contains water and glycerine as humectant. Insoluble red speckles of aluminum carboxymethyl cellulose which are oval in shape form in the sodium carboxymethyl cellulose matrix. The gel matrix is then milled with other dentifrice additives.

The gel matrix and speckles are formed from the following components:

| Component | Parts |
| --- | --- |
| Glycerine | 22.00 |
| Sodium carboxymethyl cellulose | 1.00 |
| 0.1% Aqueous solution of D&C Red No.19 | 0.1 |
| Water | 21.50 |
| Aluminum sulfate | 0.3 |

The pH of the gel is about 6.

The additives which are added to the gel matrix are:

| Additive | Parts |
| --- | --- |
| Sodium benzoate | 0.50 |
| Sodium saccharin | 0.20 |
| Sodium lauryl sulfate | 1.50 |
| Alumina Trihydrate | 52.00 |
| Flavor | 0.9 |

After milling, the speckles have a size range of about 0.1–1mm. The speckles are clearly visible and contrast with the background dentifrice. They are impalpable and easily cleared from the oral cavity following toothbrushing.

When the amorphous silicic anhydride Syloid 74 replaces 42–50 percent of the alumina trihydrate and sorbitol replaces glycerine, the background remains clear and the colored speckles can be seen within the vehicle as well as upon its surface.

EXAMPLE 2

The procedure of Example 1 is repeated using the following materials to form the gel matrix and the speckles and as additives following formation of the gel matrix and the speckles:

GEL MATRIX & SPECKLES

| Component | Parts |
| --- | --- |
| Glycerine | 22.00 |
| Sodium carboxymethyl cellulose | 1.00 |
| 0.1% aqueous solution of D&C Red No.19 | 0.12 |
| Water | 21.23 |
| Aluminum Sulfate | 0.30 |

ADDITIVES TO GEL MATRIX

| | Parts |
| --- | --- |
| Sodium benzoate | 0.50 |
| Sodium saccharin | 0.20 |
| Zinc oxide | 0.25 |
| Sodium lauryl sulfate | 1.50 |
| Alumina trihydrate | 52.00 |
| Flavor | 0.90 |

EXAMPLE 3

Aluminum sulfate is dyed with D & C Red No.19 by dry blending with a mortar and pestle and is then slowly added to an agitated sodium carboxymethyl cellulose. Red dyed oval insoluble speckles of aluminum carboxymethyl cellulose form instantaneously. The gel matrix and speckles are then milled with other dentifrice additives.

The gel matrix and speckles are formed from the following components:

| Component | Parts |
| --- | --- |
| Glycerine | 22.00 |
| Sodium carboxymethyl cellulose | 1.00 |
| Aluminum sulfate | 0.30 |
| D&C Red No.19 | 0.002 |
| Water | 21.35 |

The additives which are added to the gel matrix are:

| Additive | Parts |
| --- | --- |
| Sodium benzoate | 0.5 |
| Sodium saccharin | 0.2 |
| Zinc oxide | 0.25 |
| Sodium lauryl sulfate | 1.50 |
| Alumino trihydrate | 52.0 |

Flavor 0.9

In the gel, each of calcium hydroxide, stannous fluoride, ferric sulfate and cadmium sulfate can replace aluminum sulfate.

EXAMPLE 4

Aluminum sulfate is dyed with various colors and each colored salt is added to sodium carboxymethyl cellulose gels which have already been milled with other dentifrice additives thereby forming insoluble, oval red speckles instantaneously. The speckles have a size range of about 0.3–1.5mm.

The complete formulation of each is:

| Material | Parts |
|---|---|
| Aluminum sulfate | 0.3 |
| Dye * | 0.002 |
| Glycerine | 22.00 |
| Sodium carboxymethyl cellulose | 1.0 |
| Water | 21.85 |
| Sodium benzoate | 0.5 |
| Sodium saccharin | 0.2 |
| Sodium lauryl sulfate | 1.50 |
| Calcium carbonate | 5.00 |
| Dicalcium phosphate dihydrate | 46.75 |
| Flavor | 0.9 |

* D&C Red No.19 and FD&C Blue No.1 are employed as dyes.

EXAMPLE 5

A clear dentifrice is formed which contains dyed visible particles of aluminum carboxymethyl cellulose from the following components:

| Component | Parts |
|---|---|
| Sorbitol (70%) | 47 |
| Glycerine | 25 |
| Sodium carboxymethyl cellulose | 1 |
| Syloid 244 | 4 |
| 0.1% aqueous solution of D&C Red No.19 | 0.1 |
| Water | 2.9 |
| Aluminum sulfate | 0.3 |
| Sodium benzoate | 0.50 |
| Sodium saccharin | 0.25 |
| Sodium aluminosilicate | 16 |
| Flavor | 0.85 |
| Sodium N-lauroyl sarcosinate | 2 |

The sodium aluminosilicate employed is a complex having a refractive index of 1.46, a moisture content of about 6 percent, a mole ratio of silica to alumina of 7:1, a sodium oxide content of 7 percent, an average particle size of about 35 microns and a sieved loose bulk density of about 0.07g/cc.

It will be apparent to one skilled in the art that modifications of the above examples may be made thereto.

We claim:

1. A dentifrice gel composition wherein the gel comprises an aqueous liquid, alkali metal carboxymethyl cellulose and gelling agent having incorporated therein impalpable, non-toxic, colored particles of the water insoluble salt of carboxymethyl cellulose and a polyvalent metal selected from the group consisting of a member of periodic Group III A having an atomic number of 13 and 31.

2. The dentifrice gel composition claimed in claim 1 wherein said gel comprises 0 to about 80 percent by weight of glycerine, about 20–80 percent by weight of sorbitol and about 20–80 percent by weight of water.

3. The dentifrice gel composition claimed in claim 1 wherein said gel comprises about 15–35 percent by weight of glycerine and about 10–30 percent by weight of water.

4. The dentifrice gel composition claimed in claim 1 wherein said gelling agent is present in amount of about 0.25–10 percent and said alkali metal carboxymethyl cellulose gelling agent is present in amount of at least 0.25 percent by weight.

5. The dentifrice gel composition claimed in claim 1 wherein said polyvalent metal is aluminum.

6. The dentifrice gel composition claimed in claim 5 wherein said particles are oval and are about 0.1–1.5mm in size.

7. A dentifrice gel composition wherein the gel comprises an aqueous liquid, alkali metal carboxymethyl cellulose and gelling agent having incorporated therein impalpable, non-toxic, colored particles of the water insoluble salt of carboxymethyl cellulose and a polyvalent metal selected from the group consisting of a member of Periodic Group VIII having an atomic number of 26 and 28.

8. A dentifrice gel composition wherein the gel comprises an aqueous liquid, alkali metal carboxymethyl cellulose and gelling agent having incorporated therein impalpable, non-toxic, colored particles of the water insoluble salt of carboxymethyl cellulose and a polyvalent metal selected from the group consisting of a member of periodic Group II B having an atomic number of 30 and 48.

9. A dentifrice gel composition wherein the gel comprises an aqueous liquid, alkali metal carboxymethyl cellulose and gelling agent having incorporated therein impalpable, non-toxic, colored particles of the water insoluble salt of carboxymethyl cellulose and a polyvalent metal selected from the group consisting of a member of periodic Group IV A having an atomic number of 32–82.

10. A process for producing a dentifrice gel composition comprising incorporating a water-soluble salt or hydroxide of a salt of a polyvalent metal selected from the group consisting of a member of periodic Group II A having an atomic number of 12–56 into a gel comprising an aqueous liquid and dyed alkali metal carboxymethyl cellulose thereby forming impalpable, non-toxic, colored particles of the water-insoluble salt of carboxymethyl cellulose and said polyvalent metal.

11. A process for producing a dentifrice gel composition comprising incorporating a dyed water-soluble salt or hydroxide of a salt of a polyvalent metal selected from the group consisting of a member of periodic Group II A having an atomic number of 12–56 into a gel comprising an aqueous liquid and alkali metal carboxymethyl cellulose thereby forming impalpable, non-toxic, colored particles of the water insoluble salt of carboxymethyl cellulose and said polyvalent metal.

* * * * *

UNITED STATES PATENT OFFICE
CERTIFICATE OF CORRECTION

Patent No. 3,728,446    Dated June 11, 1974

Inventor(s) Francis D. Roberts and James Norfleet

It is certified that error appears in the above-identified patent and that said Letters Patent are hereby corrected as shown below:

COLUMN 2, LINE 13, "20-29" SHOULD READ --20-90--.

Signed and sealed this 8th day of October 1974.

(SEAL)
Attest:

McCOY M. GIBSON JR.
Attesting Officer

C. MARSHALL DANN
Commissioner of Patents